United States Patent
Mudrick et al.

(10) Patent No.: US 8,582,455 B2
(45) Date of Patent: Nov. 12, 2013

(54) SYSTEMS AND METHODS FOR MONITORING PARAMETERS OF A WIRELESS DEVICE

(75) Inventors: Adam A. Mudrick, San Diego, CA (US); Siddharth Jayaraman, San Diego, CA (US); Albert Nguyen, San Diego, CA (US); Ralph A. Gholmieh, San Diego, CA (US); Binita Gupta, San Diego, CA (US); Nagaraju Naik, San Diego, CA (US); Susheel K. Gautam, San Diego, CA (US); Daphna Zeilingold, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 375 days.

(21) Appl. No.: 12/773,406

(22) Filed: May 4, 2010

(65) Prior Publication Data

US 2011/0273998 A1    Nov. 10, 2011

(51) Int. Cl.
*H04L 12/26* (2006.01)

(52) U.S. Cl.
USPC .......................................................... 370/252

(58) Field of Classification Search
USPC .................. 370/252, 310, 331, 338; 455/421
See application file for complete search history.

(56) References Cited

U.S. PATENT DOCUMENTS

| | | |
|---|---|---|
| 6,697,953 B1 | 2/2004 | Collins |
| 2004/0214616 A1 | 10/2004 | Malcolm |
| 2006/0205406 A1 | 9/2006 | Pekonen et al. |
| 2007/0070963 A1* | 3/2007 | Li et al. ........................ 370/338 |
| 2007/0076640 A1* | 4/2007 | Bonta et al. .................. 370/310 |
| 2008/0130573 A1* | 6/2008 | Lee et al. ..................... 370/331 |
| 2008/0146231 A1 | 6/2008 | Huang et al. |
| 2008/0161072 A1 | 7/2008 | Lide et al. |
| 2008/0218535 A1 | 9/2008 | Forstall et al. |
| 2008/0268830 A1* | 10/2008 | Sharma et al. ............... 455/421 |
| 2010/0120477 A1 | 5/2010 | Imai |

FOREIGN PATENT DOCUMENTS

EP    1161107 A1    12/2001

OTHER PUBLICATIONS

International Search Report and Written Opinion—PCT/US2011/034831, ISA/EPO—Oct. 4, 2011.

* cited by examiner

*Primary Examiner* — Albert T Chou
(74) *Attorney, Agent, or Firm* — Fulbright & Jaworski LLP

(57) ABSTRACT

Systems and methods are provided for controlling monitoring operations, such as the monitoring of signal strength, media access control layer overhead information data, application layer overhead information, and/or data in a device, such as a battery powered, mobile, communication device. A user interface status and/or a flow status can be monitored. Based at least in part on the user interface status and/or the flow status, a determination can be made as to when and/or how often monitoring is to be performed.

88 Claims, 4 Drawing Sheets

SYSTEMS AND METHODS FOR MONITORING PARAMETERS OF A WIRELESS DEVICE

TECHNICAL FIELD

The present disclosed embodiments relate generally to systems and methods for parameter monitoring, and more specifically to systems and methods for monitoring parameters with respect to wireless communication devices.

BACKGROUND

Conventional wireless communication devices, such as cellular phones and other similar types of devices, periodically monitor the received signal strength of a communication signal, such as of a CDMA, GSM, UMTS, or MEDIAFLO signal. The results of the signal strength monitoring are typically displayed by a cellular phone to a user via a received signal strength indicator (RSSI). Disadvantageously, such periodic signal strength monitoring utilizes stored energy from the phone's battery, even while the phone is sleeping. The energy consumption associated with such constant periodic monitoring can be of the same order of magnitude as a cellular phone's standby power consumption, and hence significantly reduces phone standby time and talk time.

If, in an attempt to reduce power consumption, the signal power monitoring period were simply significantly lengthened so that there was a relatively longer interval between monitoring events, then the signal strength data would become stale, and hence the signal strength indicator would display significantly less relevant, outdated, information.

In addition, some broadcast technologies, for example FLO (forward link only), signal an OIS (overhead information symbol) monitoring period to receiving devices, such a FLO receiving devices. Furthermore, FLO devices monitor data channels, such as a primary flow, to ensure that upper layer overhead information is up-to-date. Current consumption caused by such monitoring in idle mode may be a large percentage of total idle current consumption.

In particular, when the FLO device is in standby mode (e.g., the device user interface is inactive), conventionally, the monitoring current consumption on FLO devices is a significant addition to the normal idle current consumption. For example, the current consumption for such monitoring in a FLO device can be more than 50% of the base current consumption for a CDMA or WCDMA idle state.

There is therefore a need in the art for systems and methods for reducing the energy consumption associated with wireless device parameter monitoring, while at the same time, providing monitoring of sufficient frequency so as not to inordinately interfere with the user experience.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Methods and systems disclosed herein address certain of the above stated needs by dynamically adjusting the occurrence and timing of obtaining and providing status updates in a battery powered device. For example, certain methods and systems determine or infer when a user of a portable, wireless communications device would and would not benefit from signal strength monitoring, and at least partly based on such determination, increase the signal strength monitoring frequency, decrease the signal strength monitoring frequency, halt the signal strength monitoring, or initiate the signal strength monitoring. Optionally, display status and/or flow status may be used, at least in part, in determining how to adjust the signal strength monitoring. Certain embodiments adjust the monitoring timing and/or frequency of a strength of a wireless signal, media access control layer overhead information, application layer overhead information and/or data based at least in part on a status of a data channel and/or a user interface.

An example embodiment provides a wireless communication apparatus configured to receive a wireless signal, the apparatus comprising: a processor; and instructions, stored on a non-transitory, tangible medium, that when executed by the processor, are configured to perform operations comprising: determining a status of at least one of the following: a user interface of the wireless communication apparatus; or a data channel; based at least in part on the user interface status or the data channel status, or both the user interface status and the data channel status, adjusting monitoring timing of: (a) a strength of a wireless signal; or (b) media access control layer overhead information; or (c) media access control layer overhead data; or (d) application layer overhead information; or (e) application layer overhead data; or (f) any combination of (a), (b), (c), (d), or (e).

An example embodiment provides instructions, stored on a non-transitory, tangible medium, that when executed by the processor, are configured to perform operations comprising: determining a status of at least one of the following: a user interface of the wireless communication apparatus; or a data channel; based at least in part on the user interface status or the data channel status, or both the user interface status and the data channel status, adjusting monitoring timing of: (a) a strength of a wireless signal; or (b) media access control layer overhead information; or (c) media access control layer overhead data; or (d) application layer overhead information; or (e) application layer overhead data; or (f) any combination of (a), (b), (c), (d), or (e).

An example embodiment provides method of monitoring in a wireless device, the method comprising: determining, using a computing device, a status of at least one of the following: a user interface of the wireless communication apparatus; or a data channel; based at least in part on the user interface status or the data channel status, or both the user interface status and the data channel status, adjusting, using the computing device, monitoring timing of: (a) a strength of a wireless signal; or (b) media access control layer overhead information; or (c) media access control layer overhead data; or (d) application layer overhead information; or (e) application layer overhead data; or (f) any combination of (a), (b), (c), (d), or (e).

An example embodiment provides a wireless communication apparatus configured to receive a wireless signal, the apparatus comprising: means for determining a status of at least one of a user interface of the wireless communication apparatus or a data channel; means for adjusting monitoring timing based at least in part on the user interface status or the data channel status, or both the user interface status and the data channel status, of: (a) a strength of a wireless signal; or (b) media access control layer overhead information; or (c) media access control layer overhead data; or (d) application layer overhead information; or (e) application layer overhead data; or (f) any combination of (a), (b), (c), (d), or (e).

DETAILED DESCRIPTION

Described herein are systems and methods that can dynamically adjust the occurrence and timing of parameter monitoring, such as the monitoring of one or more parameters of a wireless, battery powered, device. For example, certain embodiments provide methods and systems configured to determine or infer when a user of a communications device would and would not benefit from signal strength monitoring, and at least partly based on such determination, increase the signal strength monitoring frequency, decrease the signal strength monitoring frequency, halt the signal strength monitoring, or initiate the signal strength monitoring. Further, certain embodiments provide methods and systems for adjusting the frequency and/or timing of overhead system information and/or data monitoring.

In certain embodiments, the status of a user interface and/or a data channel (e.g., flow status) in a mobile, wireless communication device is determined, and based at least in part on the determination, the monitoring timing (e.g., the frequency/interval) of one or more of the following items is adjusted: a strength of a wireless signal, media access control layer overhead information (e.g., information indicating the location of a Multicast Logical Channel (MLC)), data media access control layer overhead data (e.g., an alert notification), application layer overhead information and/or data. Other parameters may, in addition or instead, be used to determine monitoring timing. Based on the status of the selected parameters, a determination may be made as to whether the monitoring frequency or interval for a given monitored item should be unaltered, decreased, or increased.

It is understood, that while certain descriptions herein may refer to determining the monitoring timing for certain items, the frequency/interval of other items can be similarly adjusted. Further, while certain descriptions herein may refer to the detection of a display being off or being on in order to adjust a monitoring period/interval, other user interface-related events may be used in addition or instead. For example, a communication device may detect when a phone keypad (e.g., physical buttons or a touch screen) has last been used, and use such detection in determining how to adjust the signal strength monitoring.

Figure 1:
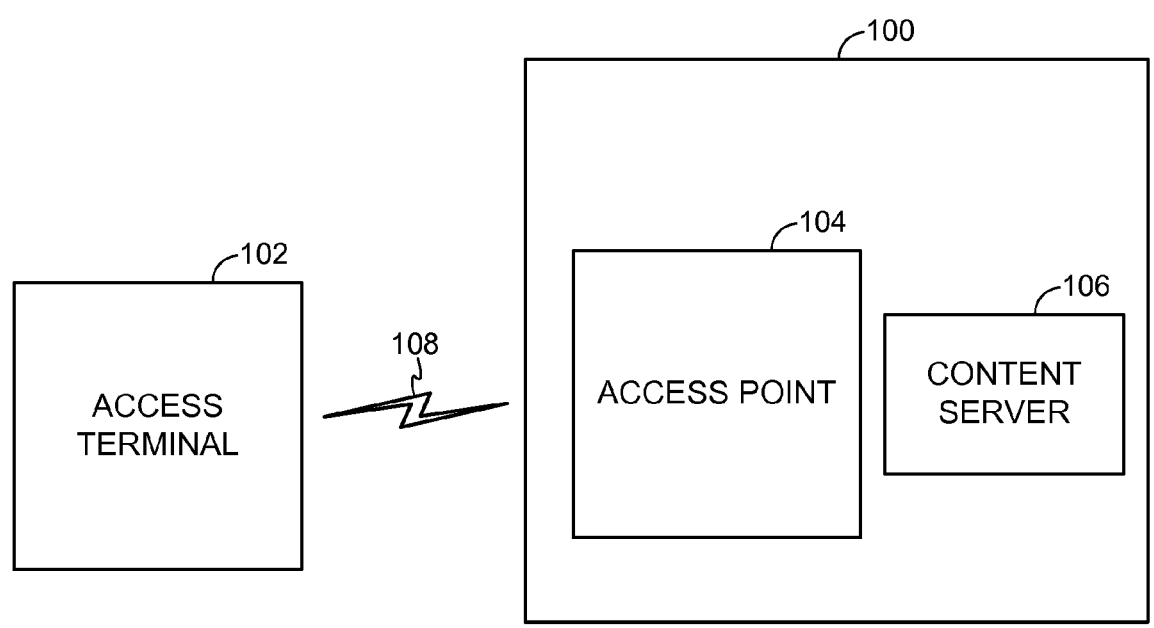
FIG. 1 is a high level block diagram of an example wireless communication system.

FIG. 1 illustrates a wireless communication system in which certain embodiments of the status monitoring methods and apparatus described herein can be employed. A system 100 includes one or more base stations or access points (also referred to as a node, femtocell access point, picocell access point, etc.) which can include a transmitter and optionally a receiver. The system 100 is capable of communication over a wireless network 108 to a second device 102 (or devices), which may be in the form of a communication device configured to receive media content.

The system 100 further includes a content server 106 coupled to an access point 104. The content server 106 stores and/or provides access to media content, such as video content, audio content, multimedia content, scripts, programs, data and/or other content. The media may comprise real-time content, non-real-time content, IP datacast content, and/or a combination of the three. The content server 106 may be configured to receive content from one or more content providers. The system 100 can transmit content to one or more user devices 102.

The device 102 may also be called an access terminal, handset, wireless subscriber, wireless unit, wireless device, wireless communications device, wireless telecommunications device, wireless telephone, cellular telephone, user terminal, user equipment, mobile station, mobile unit, subscriber station, wireless station, mobile radio, radio telephone, or some other terminology. The user device 102 may be any type of device or terminal, such as a mobile telephone, a portable computer, a personal digital assistant, mobile television, mobile entertainment device, or other type of portable device capable of receiving data over a wireless communication link. The device 102 may be a battery powered device.

The access point 104 communicates with the access terminal 102 (e.g., via a forward link). The access terminal 102 may optionally be a FLO (forward link only device), and in particular, may be a "media forward link only" device configured to operate with a media distribution system that utilizes FLO technology, such as a multimedia multicast system.

The system 100 may transmit multi-media streams on various channels coming from different sources. The smallest channel transmission unit is sometimes referred to as a MLC. Thus, an MLC may represent a flow of audio and video information of a certain channel. Several MLCs may be combined to form a superframe. A given superframe may have about a one second duration. A super-frame may comprise 1,200 symbols (or a variable number of OFDM symbols based on the bandwidth being used) that are Orthogonal Frequency Division Multiplexing (OFDM) modulated with 4,096 sub-carriers. The OFDM symbols in a superframe may include: Time Division Multiplexed (TDM) pilot symbols (TDM1, TDM2); Wide-Area and one Local Identification Channel (WIC and LIC, respectively) symbols; Overhead Information channel Symbols (OIS), including Transitional Pilot Channel (TPC) symbols; and data frames (e.g., 4 data frames). Further, at the end of each super-frame, after the four data frames, Signaling Parameter Channel (SPC) symbols are provided. These symbols are used to convey certain signaling parameters to the receiver, such as the FFT size and the length of the cyclic prefix used for OIS and data channel symbols, as further described herein.

The system 100 may multicast several services. A service can include an aggregation of one or more related data components, such as the video, audio, text or signaling associated with a service (e.g., a data channel). A given independent data component of a service is called a flow. To view a channel at the device 102, common overhead service acquisition is performed in which the device 102 acquires overhead information that enables the device 102 to locate and access services carried in the received superframes. In an example embodiment, the overhead services acquisition may include:

a control channel (CC), which can map a certain service to a specific MLC in the superframe;

a primary flow, which can carry the primary message, notifying the device 102 of the current version of other common overhead messages, so that the device 102 can detect updates to service information (SI), notification, etc. Thus, the device 102 may check whether it has the latest common overhead data by processing the primary message. If the primary message indicates that later (e.g., more updated) versions are available, the device 102 can acquire the updated service information (SI), notification messages, or configuration;

a notification flow which can carry notification messages which convey notifications from the system 100 to subsets of devices related to overhead activities such as usage tracking notifications, service alerts, client application upgrade notifications, and/or other notifications;

a service information (SI) flow which can carry system information, which provides the service definitions, media presentation guide (MPG), and marketplace information;

a configuration flow which can carry updates to network-wide operational parameters such as classification schemes related to user interface activities on the devices; and presentation metadata related to the content of real time services which may be available in Stream 0 of MLCs.

The device 102 can acquire the OIS symbols to get the CC position. The CC information can be read and the CC can be parsed to obtain the MLC-IDs. The device 102 can acquire the primary flow to run the desired service (which may, in certain circumstances, take one, two, or more seconds).

Thus, for example, device 102 may be configured to first check the primary flow message to determine what information has been updated, and then updates the information in the device accordingly. When the device 102 receives a primary message from the primary flow, the device 102 may examine the version to determine whether it is a new message. If so, the device 102 can examine the message content to determine what is being updated.

As discussed in greater detail herein, the access terminal 102 includes a status adjustment module/device configured to adjust signal strength monitoring, media access control layer overhead information and/or data, and/or application layer overhead information and/or data, based on one or more parameters.

Figure 2:
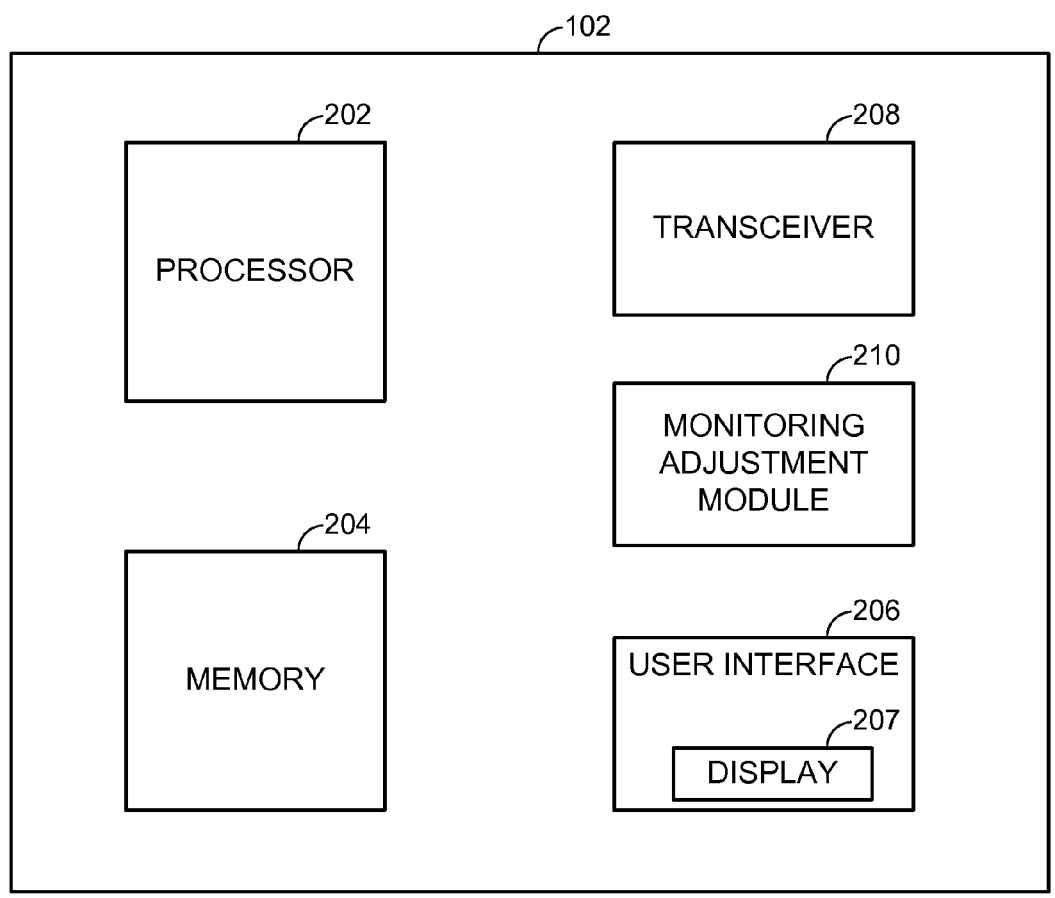
FIG. 2 illustrates an example wireless communications device.

FIG. 2 illustrates and example embodiment of the device 102 in greater detail. The device 102 may include a processor 202 configured to process information (including flows) for storage, transmission, and/or for the control of other components of the device 102. The processor 202 may further be coupled, via one or more buses, to read information from or write information to a memory 204 (e.g., program code, the processed information, etc.). For example, the device 102 may process information received from or to be transmitted via the communication network 108. The processor 202 may also be coupled to a transceiver 208 configured to modulate the information to be transmitted. The transceiver 208 may be coupled to an antenna (not shown) configured to transmit and receive information via the communication network 108. The device 102 includes a user interface 206 which may include a display 207 (which may include a dedicated RSSI display and/or a multipurpose display, such as an LCD, OLED, or other display type), a keyboard (which may include a touch screen integrated with a display, and/or may include one or more physical buttons/switches), a microphone, and/or a speaker. The device 102 may optionally be battery powered and optionally includes batteries.

The device 102 includes a monitoring adjustment module 210 configured to dynamically adjust the monitoring frequency/interval of one or more items, such as for signal strength monitoring, media access control layer overhead information monitoring, data monitoring, application layer overhead information monitoring and/or data monitoring, as discussed in greater detail below.

Certain embodiments provide systems and methods for reducing power consumption in a wireless device, such as a wireless communication device (e.g., a cellular phone, a wireless television device), by dynamically adjusting the monitoring timing of one or more parameters. By way of example, the wireless communication device may be a forward link only (FLO) device.

Certain embodiments dynamically increase the monitoring frequency, decrease the monitoring frequency (which may include halting the monitoring), or initiate monitoring of one or more items, based on one or more factors. For example, display status and/or flow status may be used, at least in part, in determining how to adjust the signal strength monitoring. By way of further example, the status of a data channel (e.g., a flow) may be used to at least in part, in determining how to adjust overhead information and/or data monitoring. Therefore, certain embodiments reduce current consumption, and hence extend battery life and standby time, by dynamically adapting the monitoring periods/timing for one or more items so as to provide a satisfactory user experience while reducing the number of overall monitoring events.

For broadcast technologies without a paging channel to monitor, such as in certain FLO devices, there is limited or no use in knowing the signal strength while the phone is in a sleep state, as the received signal strength indicator (RSSI) information is not displayed. Therefore, certain embodiments adapt the signal strength monitoring period according to the status of the phone's display and/or other factors.

For example, when the communication device display is off (as may automatically occur when the user is not actively using the communication device and the communication device is in standby/idle mode), optionally, the signal monitoring can be completely halted or the monitoring frequency can be reduced to reduce current consumption. When the display is turned on (e.g., as might occur when the device detects that the user is actively using the phone, such as by detecting that the user has activated a certain control, physically opened the device (e.g., by sliding out a keyboard or by flipping open the device in the case of a clamshell device) or when a call is being received), the device detects the display activation, and triggers a substantially immediate signal strength check and updates the RSSI with the current signal strength. Thus, substantially immediately after the RSSI display is turned on, the user can be provided with a substantially real-time signal strength status.

In addition, subsequent to an initial signal strength check, OIS check, and/or application data check, the device 102 can perform recurring signal strength checks, OIS checks, and/or application data checks, optionally at relatively shorter durations than is conventional (e.g., less than 40 seconds between signal strength measurements, less than 317 seconds for primary flow monitoring), until the device again enters a standby/idle mode (or if the RSSI is deactivated for other reasons). The interval between signal strength, OIS, and/or data checks can be adjusted, optionally dynamically adjusted, as desired.

By way of illustration, using certain conventional monitoring schemes for a FLO device, signal strength monitoring is performed once every 40 seconds. Utilizing the technique described above to reduce the frequency of signal strength monitoring events can add approximately 25%, or 100 hrs, to the standby time, without significantly adversely affecting "active" current consumption when the communication device is active (not in standby mode), and without significantly adversely affecting the user experience.

In addition, the frequency of the signal strength monitoring can be increased when the display is active as compared to a conventional monitoring frequency, to thereby provide the user with more current signal strength information when the user can actually benefit from such information. For example, conventionally, signal strength monitoring may be performed every 40 seconds. However, using the techniques described herein, the signal strength monitoring may be halted when the display is off, and may performed every 5 or 10 seconds (or other interval) when the display is on, providing the user with more current signal strength information when appropriate (e.g., when the display is on), while still reducing overall current consumption associated with such monitoring. The amount of current utilized by such monitoring may be less than 1% of the current utilized by the display, and thus will have little effect on the device's active current consumption.

Further, using certain conventional schemes, the primary flow is monitored approximately once every 317 seconds, also consuming approximately a significant percentage of standby current. Thus, reducing primary flow monitoring as described above will likewise reduce power consumption.

The foregoing technique can similarly be applied to a variety of technologies where signal strength is monitored for the purpose of displaying the signal strength to the user (e.g., DVB-H, ISDB-T, WI-FI roaming).

Optionally, an interface is provided (e.g., an application programming interface (API)) via which an entity, other than or in addition to the chip manufacturer, can set signal strength OIS, and/or data monitoring parameters and/or monitoring intervals. Thus, a handset manufacturer or cellular network operator, for example, can flexibly and easily customize communication devices via the APIs according to their needs and those of their customers.

By way of illustration, one or more API function calls are optionally provided for decreasing, increasing, or restoring the OIS (overhead information symbol) and primary flow monitoring periods. For example, an API may operate through a media flow interface (MFPAL) between a lower level/physical layer and an upper layer (e.g., the media flow data system core (MDSC)). Optionally, the MDSC obtains the monitoring frequency setting (e.g., fast/normal/slow) from the MFPAL. In certain embodiments, the MDSC polls the MFPAL to determine what flows are active and then determines whether a relatively frequent or the relatively infrequent monitoring is to be performed. The MFPAL can optionally issue monitoring frequency update events accordingly.

By way of background, an OIS comprises some or all of the following: control channel (CC) information and reserved flow data comprising primary flow data, service information data, notification flow data, configuration flow data, and presentation metadata.

The function call for restoring "normal" (relatively more frequent monitoring as compared to when the display is off) monitoring settings may optionally be called when turning on the communication device display, and the function call for relaxing (relatively less frequency monitoring as compared to the normal monitoring) the monitoring periods may optionally be called upon turning off the communication device display.

Optionally, the request for slower monitoring of the OIS and/or primary flow is denied if there are pending unmapped flows (e.g., where the device could not find a requested flow identifier in the control channel), if the display is active, and/or if an emergency alert has been received via the OIS or CC. Of course fewer or additional parameters may be taken into account in determining how to adjust the monitoring frequency/interval.

By way of illustration, if the communication device is waiting for a flow to become active for downloading a file (e.g., an upper level layer submits a request for a flow using a flow identifier, but the flow is not yet mapped or detected in the CC) and/or optionally if there is a pending emergency alert, the device can keep the monitoring at the current signal strength monitoring frequency/interval. Thus, once the previously unmapped flow is detected in the CC, the device can substantially immediately monitor the flow.

Optionally, when the communication device user interface is activated (e.g., when the display is being turned on because the device is leaving standby mode and entering active mode), the user interface procedure can call the function for more frequent or "normal" signal strength monitoring.

On the other hand, in an optional embodiment, if the device determines that there are no active flows and no unmapped flows, the device can automatically adjust the monitoring interval to be longer (by decreasing the monitoring frequency), to thereby dynamically reduce overall power consumption, and in particular, reduce power consumption when the device is in standby mode. Optionally, when the communication device user interface exits (e.g., when the display is being automatically or manually turned off because the device is entering standby mode), the user interface procedure calls the function for less frequent signal strength monitoring (e.g., decreases the monitoring frequency of the OIS and/or primary flow by 50%, by 75%, halts the monitoring entirely, etc.).

If the device 102 determines that there are active flows or unmapped flows, or other situations where it is advisable to conduct more frequent monitoring of the device signal strength, the device 102 may automatically maintain or decrease the interval between monitoring events (increase the monitoring frequency). Thus, if the device 102 had been performing "slow" monitoring, the device may automatically revert to a "normal" or faster monitoring mode (e.g., at or no more than about 40 seconds between OIS signal strength measurements, no more than about 317 seconds between primary flow monitoring events).

Optionally, the monitoring rate can be increased above the "normal" rate in response to one or more conditions. For example, upon receipt or detection of an emergency alert received via the OIS or CC, the monitoring rate may be increased to ensure that the emergency alert information is not stale.

Figure 3:
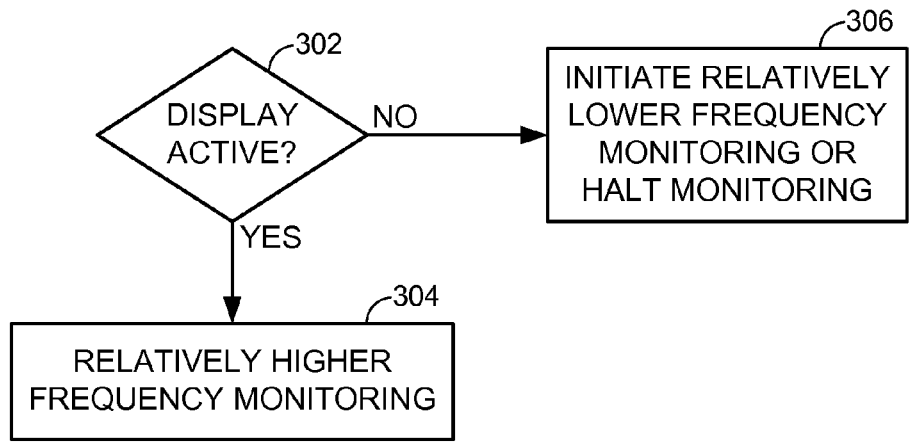
FIG. 3 illustrates a first example monitoring adjustment process.

FIG. 3 illustrates an example process configured to adjust status monitoring, such as the monitoring of signal strength in a wireless, mobile, communication device, using the status of a user interface of the device (e.g., a display status). The process may optionally be executed via the monitoring adjustment module 210, illustrated in FIG. 2.

At state 302, a determination is made as to whether the communication device display is active or, optionally, is about to become active (e.g., turned on). For example, the device may automatically turn on the display in response to detecting that the user may want to actively use the phone (e.g., by detecting that the user has activated a certain control/pressed a key), or when a call is being received.

If the determination indicates the communication device display is active or, optionally, about to become active, the process proceeds to state 304, relatively higher frequency signal strength monitoring is performed (relative to the monitoring frequency of state 306), and the results of the monitoring (e.g., the signal strength) is displayed via the communication device display (which may be a dedicated RSSI display or a multipurpose display). Optionally, signal strength monitoring can be performed substantially immediately after a determination is made that the display is about to or has just turned on to quickly provide the user with current signal strength information. The monitoring can then be performed at the appropriate interval.

If, at state 302, a determination is made that the communication device display is inactive or, optionally, is about to become inactive (e.g., turned off or with just the backlighting or other illumination turned off), the process proceeds to state 306. For example, the device may automatically turn off the display in response to the user activating a standby control or if the user has not activated a user input control for a certain period of time, and the process detects the off state.

At state 306, relatively lower frequency signal strength monitoring is performed (relative to the monitoring frequency of state 304) or, optionally, signal strength monitoring can be halted completely. If it is later determined that the display is or is about to become active, the process then proceeds to state 304, as discussed above.

Figure 4:
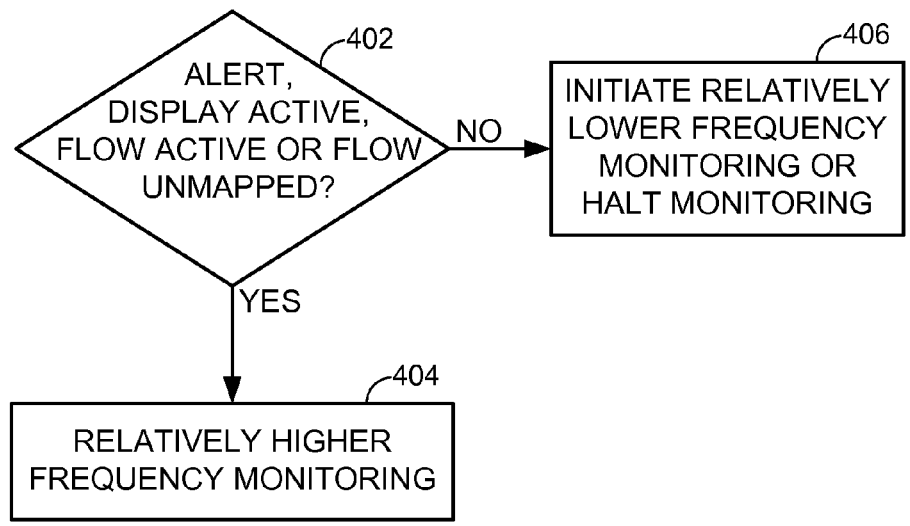
FIG. 4 illustrates a second example monitoring adjustment process.

FIG. 4 illustrates another example process configured to adjust monitoring, such as the monitoring of signal strength, OIS, and/or data in a wireless, mobile, communication device, using flow status. The process may optionally be executed via the monitoring adjustment module 210, illustrated in FIG. 2.

At state 402, a determination is made as to whether:
an emergency alert has been received;
the communication device display is active or, optionally, is about to become active (e.g., turned on);
a flow is active; or
there is an unmapped flow (e.g., a requested, but not yet located or received flow).

If the determination indicates there is a current emergency alert, an active flow or an unmapped flow, or that the communication device display is active (or, optionally, about to become active) the process proceeds to state 404; relatively higher frequency monitoring is performed (relative to the monitoring frequency of state 406), and the results can be optionally displayed via the communication device display (which may be a multipurpose display, a dedicated RSSI display, or other display).

If, at state 402, a determination is made that there are no current emergency alert, active flows or unmapped flows, and the display is not active (or, optionally, about to become active) the process proceeds to state 406. At state 406, relatively lower frequency signal strength, OIS, and/or data monitoring is performed (relative to the monitoring frequency of state 404) or, optionally, monitoring of one or more of the foregoing parameters can be halted completely.

Figure 5:
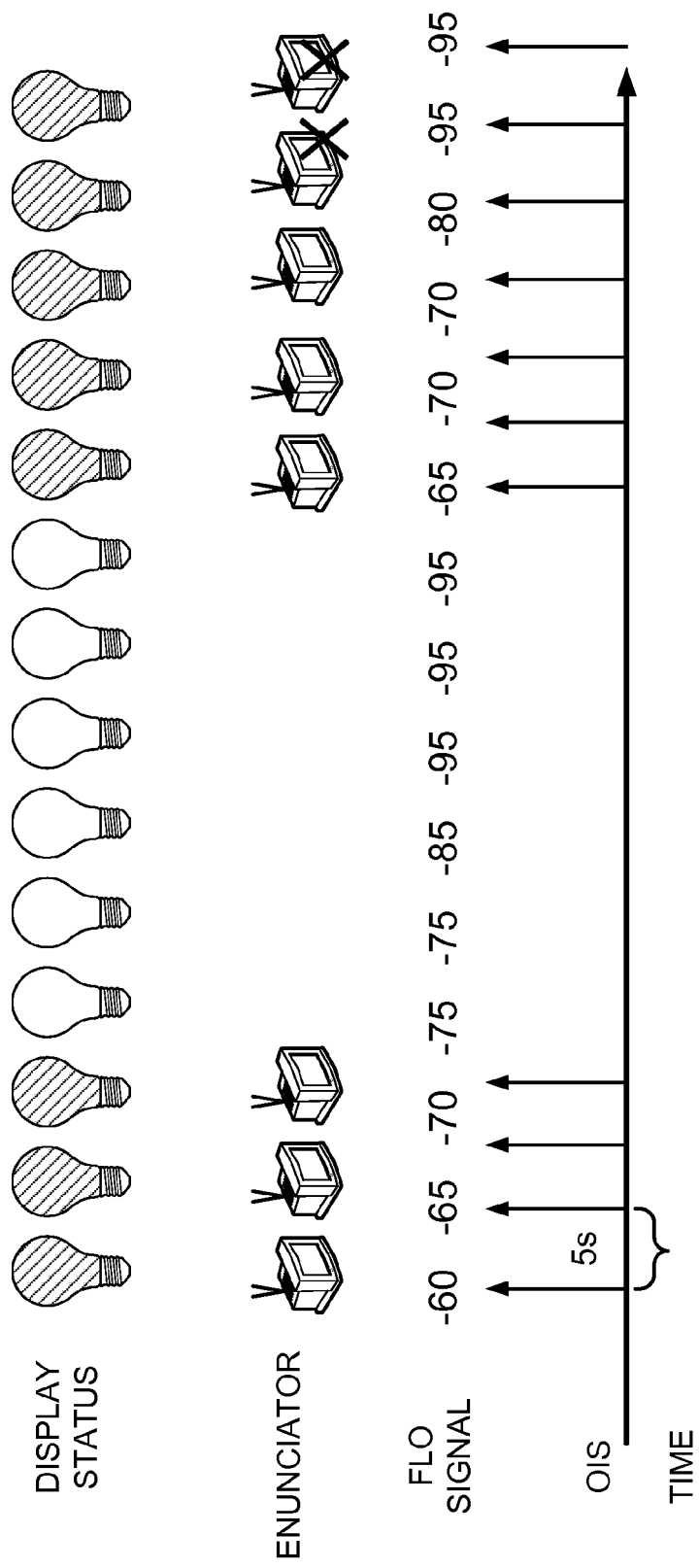
FIG. 5 illustrates an example scenario with respect to an example monitoring adjustment process.

FIG. 5 illustrates an example scenario with respect to an example monitoring adjustment process of a wireless, mobile FLO communication device, wherein the adjustment is performed based at least in part on display status. When the display status indicates that the RSSI enunciator is active (on), the FLO OIS signal strength monitoring is performed by the communication device at a first rate, once every 5 seconds in this example. This is a substantially higher rate than used in many conventional mobile devices, and so provides more current signal strength information more often than conventional approaches. When the display status indicates that the RSSI enunciator is inactive (off), the FLO OIS signal strength monitoring is halted, thereby extending battery life without a significant adverse impact on the currency of the signal strength information provided to the user when the user actually may need such information.

Thus, embodiments described herein can improve standby life by significant amounts (e.g., by 35%, 60%, or other amount, depending on the monitoring frequency), while providing more current status information when needed.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any embodiment described herein as "exemplary" is not necessarily to be construed as preferred or advantageous over other embodiments.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. The order of various method states described herein can be interchanged without departing from the scope of the invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary non-transitory computer readable storage medium can be coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless communication apparatus configured to receive a wireless signal, the apparatus comprising:
a processor; and
instructions, stored on a non-transitory, tangible medium, that when executed by the processor, are configured to perform operations comprising:
determining a status of a display of the wireless communication apparatus, wherein the status of the display indicates whether the display is on or off; and
adjusting, based at least in part on the status of the display, monitoring timing of media access control layer overhead information.

2. The wireless communication apparatus as defined in claim 1, wherein the instructions are further configured to perform operations comprising:
determining a status of a data channel; and
adjusting, based at least in part on the status of the data channel, or both the status of the display and the status of the data channel, monitoring timing of media access control layer overhead information.

3. The wireless communication apparatus as defined in claim 2, wherein the media access control layer overhead information comprises media access control layer overhead data.

4. The wireless communication apparatus as defined in claim 3, wherein adjusting monitoring timing further comprises reducing a monitoring frequency of the media access control layer overhead information based at least in part on at least one of a determination that there is not an active flow or there is not an unmapped flow.

5. The wireless communication apparatus as defined in claim 3, wherein adjusting monitoring timing further comprises reducing a monitoring frequency of the media access control layer overhead information based at least in part on at least one of a determination that there is not an active flow, there is not an unmapped flow, or the display is inactive.

6. The wireless communication apparatus as defined in claim 3, wherein adjusting monitoring timing further comprises adjusting a monitoring frequency of the media access control layer overhead information based in part on the presence of an emergency alert notification.

7. The wireless communication apparatus as defined in claim 2, wherein determining the status of the data channel further comprises determining whether there is an unmapped flow.

8. The wireless communication apparatus as defined in claim 2, wherein determining the status of the data channel further comprises determining whether there is an active flow.

9. The wireless communication apparatus as defined in claim 1, wherein adjusting monitoring timing further comprises reducing a signal strength monitoring frequency based at least in part on a determination that the display is inactive.

10. The wireless communication apparatus as defined in claim 1, wherein adjusting monitoring timing further comprises increasing a signal strength monitoring frequency based at least in part on a determination that the display is active or is about to become active.

11. The wireless communication apparatus as defined in claim 1, wherein the wireless communication device comprises a battery powered, wireless television device.

12. A non-transitory, computer-readable storage medium for storing instructions, that when executed by a computing device, are configured to perform operations comprising:
determining a status of a display of the wireless communication apparatus, wherein the status of the display indicates whether the display is on or off; and
adjusting, based at least in part on status of the display, monitoring timing of media access control layer overhead information.

13. The medium as defined in claim 12, wherein the instructions are further configured to perform operations comprising:
determining a status of a data channel; and
adjusting, based at least in part on the status of the data channel, or both the status of the display and the status of the data channel, monitoring timing of media access control layer overhead information.

14. The medium as defined in claim 13, wherein the media access control layer overhead information comprises media access control layer overhead data.

15. The medium as defined in claim 14, wherein adjusting monitoring timing further comprises reducing a monitoring frequency of the media access control layer overhead information based at least in part on at least one of a determination that there is not an active flow or there is not an unmapped flow.

16. The medium as defined in claim 14, wherein adjusting monitoring timing further comprises reducing a monitoring frequency of the media access control layer overhead information based at least in part on at least one of a determination that there is not an active flow, there is not an unmapped flow, or the display is inactive.

17. The medium as defined in claim 14, wherein adjusting monitoring timing further comprises adjusting a monitoring frequency of the media access control layer overhead information based in part on the presence of an emergency alert notification.

18. The medium as defined in claim 13, wherein determining the status of the data channel further comprises determining whether there is an unmapped flow.

19. The medium as defined in claim 13, wherein determining the status of the data channel further comprises determining whether there is an active flow.

20. The medium as defined in claim 12, wherein adjusting monitoring timing further comprises reducing a signal strength monitoring frequency based at least in part on a determination that the display is inactive.

21. The medium as defined in claim 12, wherein adjusting monitoring timing further comprises increasing a signal strength monitoring frequency based at least in part on a determination that the display is active or is about to become active.

22. The medium as defined in claim 12, wherein the wireless communication device comprises a wireless television device.

23. A method of monitoring parameters of a wireless device, the method comprising:
determining, using a computing device, a status of a display of the wireless device, wherein the status of the display indicates whether the display is on or off; and
adjusting, based at least in part on the status of the display, monitoring timing of media access control layer overhead information.

24. The method as defined in claim 23, further comprising:
determining a status of a data channel; and
adjusting, based at least in part on the status of the data channel, or both the status of the display and the status of the data channel, monitoring timing of media access control layer overhead information.

25. The method as defined in claim 24, wherein the media access control layer overhead information comprises media access control layer overhead data.

26. The method as defined in claim 25, wherein adjusting monitoring timing further comprises reducing a monitoring frequency of the media access control layer overhead information based at least in part on at least one of a determination that there is not an active flow or there is not an unmapped flow.

27. The method as defined in claim 25, wherein adjusting monitoring timing further comprises reducing a monitoring frequency of the media access control layer overhead information based at least in part on at least one of a determination that there is not an active flow, there is not an unmapped flow, or the display is inactive.

28. The method as defined in claim 25, wherein adjusting monitoring timing further comprises adjusting a monitoring frequency of the media access control layer overhead information based in part on the presence of an emergency alert notification.

29. The method as defined in claim 24, wherein determining the status of the data channel further comprises determining whether there is an unmapped flow.

30. The method as defined in claim 24, wherein determining the status of at least one of the data channel further comprises determining whether there is an active flow.

31. The method as defined in claim 23, wherein adjusting monitoring timing further comprises reducing a signal strength monitoring frequency based at least in part on a determination that the display is inactive.

32. The method as defined in claim 23, wherein adjusting monitoring timing further comprises increasing a signal strength monitoring frequency based at least in part on a determination that the display is active or is about to become active.

33. The method as defined in claim 23, wherein the wireless communication device comprises a wireless television device.

34. A wireless communication apparatus configured to receive a wireless signal, the apparatus comprising:
  means for determining a status of a display of the wireless communication apparatus, wherein the status of the display indicates whether the display is on or off; and
  means for adjusting monitoring timing, based at least in part on the status of the display, of media access control layer overhead information.

35. The wireless communication apparatus as defined in claim 34, further comprising:
  means for determining a status of a data channel; and
  means for adjusting monitoring timing, based at least in part on the status of the data channel, or both the status of the display and the status of the data channel, of media access control layer overhead information.

36. The wireless communication apparatus as defined in claim 35, wherein the media access control layer overhead information comprises media access control layer overhead data.

37. The wireless communication apparatus as defined in claim 36, wherein the means for adjusting monitoring timing is configured to reduce a frequency of monitoring the media access control layer overhead information based at least in part on at least one of a determination that there is not an active flow or there is not an unmapped flow.

38. The wireless communication apparatus as defined in claim 36, wherein the means for adjusting monitoring timing is configured to reduce a frequency of monitoring the media access control layer overhead information based at least in part on at least one of a determination that there is not an active flow, there is not an unmapped flow, or the display is inactive.

39. The wireless communication apparatus as defined in claim 36, wherein the means for adjusting monitoring timing is configured to adjust the monitoring timing of the media access control layer overhead information based in part on the presence of an emergency alert notification.

40. The wireless communication apparatus as defined in claim 35, wherein the means for determining a status is configured to determine whether there is an unmapped flow.

41. The wireless communication apparatus as defined in claim 35, wherein the means for determining a status is configured to determine whether there is an active flow.

42. The wireless communication apparatus as defined in claim 34, wherein the means for adjusting monitoring timing is configured to reduce a signal strength monitoring frequency based at least in part on a determination that the display is inactive.

43. The wireless communication apparatus as defined in claim 34, wherein the means for adjusting monitoring timing is configured to increase a signal strength monitoring frequency based at least in part on a determination that the display is active or is about to become active.

44. The wireless communication apparatus as defined in claim 34, wherein the wireless communication device comprises a battery powered, wireless television device.

45. A wireless communication apparatus configured to receive a wireless signal, the apparatus comprising:
  a processor; and
  instructions, stored on a non-transitory, tangible medium, that when executed by the processor, are configured to perform operations comprising:
    determining a status of a display of the wireless communication apparatus, wherein the status of the display indicates whether the display is on or off; and
    adjusting, based at least in part on the status of the display, monitoring timing of application layer overhead information.

46. The wireless communication apparatus as defined in claim 45, wherein the instructions are further configured to perform operations comprising:
    determining a status of a data channel; and
    adjusting, based at least in part on the status of the data channel, or both the status of the display and the status of the data channel, monitoring timing of application layer overhead information.

47. The wireless communication apparatus as defined in claim 46, wherein determining the status of the data channel further comprises determining whether there is an unmapped flow.

48. The wireless communication apparatus as defined in claim 46, wherein determining the status of the data channel further comprises determining whether there is an active flow.

49. The wireless communication apparatus as defined in claim 46, wherein the application layer overhead information comprises application layer overhead data.

50. The wireless communication apparatus as defined in claim 49, wherein adjusting monitoring timing further comprises reducing a monitoring frequency of the application layer overhead information based at least in part on at least one of a determination that there is not an active flow or there is not an unmapped flow.

51. The wireless communication apparatus as defined in claim 49, wherein adjusting monitoring timing further comprises reducing a monitoring frequency of the application layer overhead information based at least in part on at least one of a determination that there is not an active flow, there is not an unmapped flow, or the display is inactive.

52. The wireless communication apparatus as defined in claim 49, wherein adjusting monitoring timing further comprises adjusting a monitoring frequency of the application layer overhead information based in part on the presence of an emergency alert notification.

53. The wireless communication apparatus as defined in claim 45, wherein adjusting monitoring timing further comprises reducing a signal strength monitoring frequency based at least in part on a determination that the display is inactive.

54. The wireless communication apparatus as defined in claim 45, wherein adjusting monitoring timing further comprises increasing a signal strength monitoring frequency based at least in part on a determination that the display is active or is about to become active.

55. The wireless communication apparatus as defined in claim 45, wherein the wireless communication device comprises a battery powered, wireless television device.

56. A non-transitory, computer-readable storage medium for storing instructions, that when executed by a computing device, are configured to perform operations comprising:
    determining a status of a display of the wireless communication apparatus, wherein the status of the display indicates whether the display is on or off; and
    adjusting, based at least in part on status of the display, monitoring timing of application layer overhead information.

57. The medium as defined in claim 56, wherein the instructions are further configured to perform operations comprising:
    determining a status of a data channel; and
    adjusting, based at least in part on the status of the data channel, or both the status of the display and the status of the data channel, monitoring timing of application layer overhead information.

58. The medium as defined in claim 57, wherein determining the status of the data channel further comprises determining whether there is an unmapped flow.

59. The medium as defined in claim 57, wherein determining the status of the data channel further comprises determining whether there is an active flow.

60. The medium as defined in claim 57, wherein the application layer overhead information comprises application layer overhead data.

61. The medium as defined in claim 60, wherein adjusting monitoring timing further comprises reducing a monitoring frequency of the application layer overhead information based at least in part on at least one of a determination that there is not an active flow or there is not an unmapped flow.

62. The medium as defined in claim 60, wherein adjusting monitoring timing further comprises reducing a monitoring frequency of the application layer overhead information based at least in part on at least one of a determination that there is not an active flow, there is not an unmapped flow, or the display is inactive.

63. The medium as defined in claim 60, wherein adjusting monitoring timing further comprises adjusting a monitoring frequency of the application layer overhead information based in part on the presence of an emergency alert notification.

64. The medium as defined in claim 56, wherein adjusting monitoring timing further comprises reducing a signal strength monitoring frequency based at least in part on a determination that the display is inactive.

65. The medium as defined in claim 56, wherein adjusting monitoring timing further comprises increasing a signal strength monitoring frequency based at least in part on a determination that the display is active or is about to become active.

66. The medium as defined in claim 56, wherein the wireless communication device comprises a wireless television device.

67. A method of monitoring parameters of a wireless device, the method comprising:
    determining, using a computing device, a status of a display of the wireless device, wherein the status of the display indicates whether the display is on or off; and
    adjusting, based at least in part on the status of the display, monitoring timing of application layer overhead information.

68. The method as defined in claim 67, further comprising:
    determining a status of a data channel; and
    adjusting, based at least in part on the status of the data channel, or both the status of the display and the status of the data channel, monitoring timing of application layer overhead information.

69. The method as defined in claim 68, wherein determining the status of the data channel further comprises determining whether there is an unmapped flow.

70. The method as defined in claim 68, wherein determining the status of at least one of the data channel further comprises determining whether there is an active flow.

71. The method as defined in claim 68, wherein the application layer overhead information comprises application layer overhead data.

72. The method as defined in claim 71, wherein adjusting monitoring timing further comprises reducing a monitoring frequency of the application layer overhead information based at least in part on at least one of a determination that there is not an active flow or there is not an unmapped flow.

73. The method as defined in claim 71, wherein adjusting monitoring timing further comprises reducing a monitoring frequency of the application layer overhead information based at least in part on at least one of a determination that there is not an active flow, there is not an unmapped flow, or the display is inactive.

74. The method as defined in claim 71, wherein adjusting monitoring timing further comprises adjusting a monitoring frequency of the application layer overhead information based in part on the presence of an emergency alert notification.

75. The method as defined in claim 67, wherein adjusting monitoring timing further comprises reducing a signal strength monitoring frequency based at least in part on a determination that the display is inactive.

76. The method as defined in claim 67, wherein adjusting monitoring timing further comprises increasing a signal strength monitoring frequency based at least in part on a determination that the display is active or is about to become active.

77. The method as defined in claim 67, wherein the wireless communication device comprises a wireless television device.

78. A wireless communication apparatus configured to receive a wireless signal, the apparatus comprising:
    means for determining a status of a display of the wireless communication apparatus, wherein the status of the display indicates whether the display is on or off; and
    means for adjusting monitoring timing, based at least in part on the status of the display, of application layer overhead information.

79. The wireless communication apparatus as defined in claim 78, further comprising:
   means for determining a status of a data channel; and
   means for adjusting monitoring timing, based at least in part on the status of the data channel, or both the status of the display and the status of the data channel, of application layer overhead information.

80. The wireless communication apparatus as defined in claim 79, wherein the means for determining a status is configured to determine whether there is an unmapped flow.

81. The wireless communication apparatus as defined in claim 79, wherein the means for determining a status is configured to determine whether there is an active flow.

82. The wireless communication apparatus as defined in claim 79, wherein the application layer overhead information comprises application layer overhead data.

83. The wireless communication apparatus as defined in claim 82, wherein the means for adjusting monitoring timing is configured to reduce a frequency of monitoring the application layer overhead information based at least in part on at least one of a determination that there is not an active flow or there is not an unmapped flow.

84. The wireless communication apparatus as defined in claim 82, wherein the means for adjusting, monitoring timing is configured to reduce a frequency of monitoring the application layer overhead information based at least in part on at least one of a determination that there is not an active flow, there is not an unmapped flow, or the display is inactive.

85. The wireless communication apparatus as defined in claim 82, wherein the means for adjusting monitoring timing is configured to adjust the monitoring timing of the application layer overhead information based in part on the presence of an emergency alert notification.

86. The wireless communication apparatus as defined in claim 78, wherein the means for adjusting monitoring timing is configured to reduce a signal strength monitoring frequency based at least in part on as determination that the display is inactive.

87. The wireless communication apparatus as defined in claim 78, wherein the means for adjusting monitoring timing is configured to increase a signal strength monitoring frequency based at least in part on a determination that the display is active or is about to become active.

88. The wireless communication apparatus as defined in claim 78, wherein the wireless communication device comprises a battery powered, wireless television device.

* * * * *